(12) United States Patent
Miyamoto et al.

(10) Patent No.: US 6,455,137 B1
(45) Date of Patent: Sep. 24, 2002

(54) RECORDING MATERIAL

(75) Inventors: Kenichi Miyamoto; Masahiro Makino, both of Fukui (JP)

(73) Assignee: NICCA Chemical Co., Ltd., Fukui (JP)

( * ) Notice: Subject to any disclaimer, the term of this patent is extended or adjusted under 35 U.S.C. 154(b) by 0 days.

(21) Appl. No.: 09/786,284

(22) PCT Filed: Mar. 24, 2000

(86) PCT No.: PCT/JP00/01831

§ 371 (c)(1),
(2), (4) Date: Mar. 2, 2001

(87) PCT Pub. No.: WO00/58107

PCT Pub. Date: Oct. 5, 2000

(30) Foreign Application Priority Data

Mar. 29, 1999 (JP) ............................................. 10-086497

(51) Int. Cl.$^7$ .............................. B32B 27/14; B32B 3/00
(52) U.S. Cl. .................... 428/195; 428/211; 428/411.1; 428/537.5
(58) Field of Search ................................ 428/195, 211, 428/411.1, 537.5

(56) References Cited

U.S. PATENT DOCUMENTS

| | | | |
|---|---|---|---|
| 4,746,403 A | 5/1988 | Ko et al. ..................... | 162/108 |
| 5,342,688 A | 8/1994 | Kitchin et al. ............... | 428/402 |
| 5,729,266 A | * 3/1998 | Malhotra .................... | 347/102 |
| 6,197,880 B1 | * 3/2001 | Nigam ........................ | 524/845 |

FOREIGN PATENT DOCUMENTS

| | | |
|---|---|---|
| JP | 56-84992 | 7/1981 |
| JP | 60-49990 | 3/1985 |
| JP | 6-92012 | 4/1994 |
| JP | 9-1922 | 1/1997 |
| JP | 9-254529 | 9/1997 |

* cited by examiner

*Primary Examiner*—Cynthia H. Kelly
*Assistant Examiner*—B. Shewareged
(74) *Attorney, Agent, or Firm*—Leydig, Voit & Mayer, Ltd.

(57) ABSTRACT

A recording material comprising a substrate and a polyguanidine salt of the general formula (1) contained in said substrate:

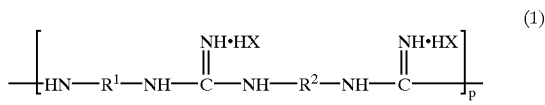

wherein $R^1$ and $R^2$ may be the same or different, and each represents a group selected from the group consisting of a divalent aliphatic hydrocarbon group, a divalent aromatic hydrocarbon group and a divalent alicyclic hydrocarbon group; HX is an acid selected from the group consisting of a mineral acid and an organic acid; and p is an integer of 1 to 250.

6 Claims, No Drawings

RECORDING MATERIAL

TECHNICAL FIELD

The present invention relates to a recording material, and more particularly, to a recording material which is especially suitable for use in the ink-jet recording system.

BACKGROUND ART

The recent spread of personal computers not only in enterprises, but also at home has brought about an increase in the printing of information by printers. The recent improvement in performance of personal computers has made it possible to handle image data consisting of a large amount of information very easily and has brought about an increase in the printing of images in full color.

Examples of printing and recording systems by printers include ink-jet recording systems, heat-transfer recording systems, sublimation transfer recording systems and direct heat-sensitive recording systems. All of these systems require a recording material to have characteristics including a high printing density, an excellent color developing property, resistance to blotting during printing, and resistance to ink flow and blotting when the recording material is wetted with water.

For the ink-jet recording systems in which recording is made by spraying fine ink droplets onto a recording material such as paper, it is particularly important to ensure that the ink does not blot the recording material when adhering to it, nor should the ink on the recording material flow or blot with water contact.

Attempts have been made to add various compounds to a recording material to meet the requirements stated above. For example, studies into the addition of various chemicals into a recording material have been made. Such chemicals include polyethyleneimine, a quaternary compound of polyvinyl pyridine disclosed in Japanese Laid-Open Patent Application (JP-A) No. 56-84992, a condensation product of polyalkylenepolyaminedicyandiamide disclosed in Japanese Laid-Open Patent Application (JP-A) No. 60-49990, and a reaction product of a secondary amine and epihalohydrin disclosed in Japanese Laid-Open Patent Application (JP-A) No. 6-92012.

DISCLOSURE OF THE INVENTION

However, a recording material that meets all of the above-stated requirements for the various printing and recording systems is not yet known. Since the ink-jet recording system normally employs the ink containing a water-soluble dye or water-dispersible dye, it is especially difficult to solve the problems of ink blotting during printing, and flowing or blotting of ink on the recording material with water contact after printing, even if a recording material containing the above-mentioned chemicals is used.

In view of these technical problems, it is an object of the present invention to provide a recording material, which is particularly suitable for use in an ink-jet recording system, which does not exhibit blotting of ink during printing and flowing or blotting of ink with water contact after printing.

The inventors have made detailed studies into means for achieving the above-mentioned object and, as a result, have found that the addition of a polyguanidine salt into a substrate makes it possible to obtain a recording material which does not exhibit blotting of ink during printing and flowing or blotting of ink with water contact after printing. The inventors have also found that a recording material comprising a substrate and a polyguanidine salt contained in the substrate is particularly effective in preventing blotting of ink during printing, and flowing or blotting of ink by water contact after printing, when inks for the ink-jet recording system which contain a water-soluble dye or a water-dispersible dye are used, thereby accomplishing the present invention.

Thus, the present invention provides a recording material comprising a substrate and a polyguanidine salt of the general formula (1) contained in the substrate:

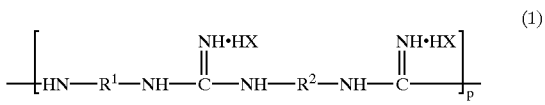

wherein $R^1$ and $R^2$ may be the same or different, and each represents a group selected from the group consisting of a divalent aliphatic hydrocarbon group, a divalent aromatic hydrocarbon group and a divalent alicyclic hydrocarbon group; HX is an acid selected from the group consisting of a mineral acid and an organic acid; and p is an integer of 1 to 250.

According to the present invention, the polyguanidine salt is preferably a polyguanidine salt of the general formula (2):

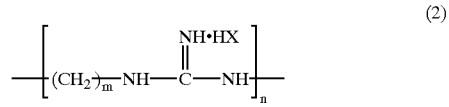

wherein HX is an acid selected from the group consisting of a mineral acid and an organic acid; n is an integer of 3 to 500; and m is an integer of 2 to 6.

The present invention also provides a recording material in which the substrate comprises at least one material selected from the group consisting of paper, a fibrous material and a resin film.

The substrate of the recording material of the present invention preferably contains the polyguanidine salt in an amount of 0.01 to 10 g per square meter in the vicinity of its surface. And the recording material preferably contains the polyguanidine salt in an amount of 0.01 to 10% by weight based on a total weight of the recording material.

The present invention further provides a recording material which is suitable for an ink-jet recording system.

BEST MODE FOR CARRYING OUT THE INVENTION

The present invention will now be described in detail.

The recording material of the present invention comprises a substrate and a polyguanidine salt of the general formula (1) contained in the substrate:

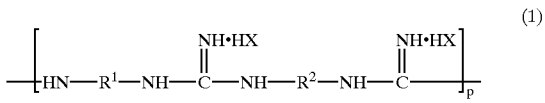

wherein $R^1$ and $R^2$ may be the same or different, and each represents a group selected from the group consisting of a divalent aliphatic hydrocarbon group, a divalent aromatic hydrocarbon group and a divalent alicyclic hydrocarbon group; HX is an acid selected from the group consisting of a mineral acid and an organic acid; and p is an integer of 1 to 250.

Here, the polyguanidine salt means a salt formed from a polyguanidine of the general formula (3) and an acid HX:

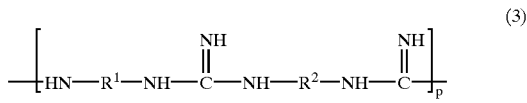

(3)

wherein $R^1$ and $R^2$ may be the same or different, and each represents a group selected from the group consisting of a divalent aliphatic hydrocarbon group, a divalent aromatic hydrocarbon group and a divalent alicyclic hydrocarbon group; and p is an integer of 1 to 250.

HX in the general formula (1) is not particularly limited as long as it is an acid that forms a salt with guanidine. Any of various known mineral or organic acids is preferably used. The mineral acids that can be used include hydrochloric acid, sulfuric acid, nitric acid, phosphoric acid and carbonic acid. The organic acids that can be used include monobasic acids represented by acetic acid, lactic acid and gluconic acid; and polybasic acids represented by maleic acid, fumaric acid and tartaric acid. In the present invention, phosphoric acid, hydrochloric acid and lactic acid are preferably used.

The polyguanidine salt of the general formula (1) can be obtained by, for example, reacting diamine with diisothiocyanate to obtain polythiourea, converting =S in the thiourea group in the polythiourea into =NH by an adequate functional group conversion to obtain polyguanidine of the general formula (3), and neutralizing the polyguanidine with an acid HX. Since the polyguanidine salt of the general formula (1) can be obtained by polyaddition as described above, the terminal of its molecule may form amino group (—$NH_2$) derived from diamine, isothiocyanate group (—NCS) derived from diisothiocyanate, or a functional group derived by the above-mentioned functional group conversion and/or neutralization.

In general formula (1), p is an integer of 1 to 250. Preferably, p is an integer of 3 to 250. When p exceeds 250, the polyguanidine salt has too high molecular weight for easy handling. $R^1$ and $R^2$ are preferably a divalent aliphatic hydrocarbon group, and more preferably a divalent aliphatic hydrocarbon group having 1 to 12 carbons. In this case, $R^1$ can be different from $R^2$. In the present invention, the polyguanidine salt may be used alone or in combination of two or more kinds.

In present invention, the polyguanidine salt of the general formula (1) is preferably a polyguanidine salt of the general formula (2):

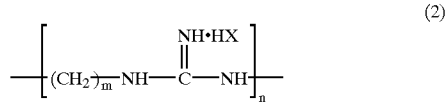

(2)

wherein HX is an acid selected from the group consisting of a mineral acid and an organic acid; n is an integer of 3 to 500, and m is an integer of 2 to 6.

The general formula (1) wherein $R^1$ and $R^2$ are both —$(CH_2)_m$— corresponds to the general formula (2). The polyguanidine salt of the general formula (2) can be obtained by, for example, reacting diamine having a chemical structure of $H_2N$—$(CH_2)_m$—$NH_2$ with disothiocyanate having a chemical structure of SCN—$(CH_2)_m$—NCS to obtain polythiourea, converting =S in the polythiourea into =NH, and then neutralizing the resultant product with an acid HX. The polyguanidine salt of the general formula (2) has a portion of alkylene, therefore it may be called a polyalkyleneguanidine salt. The acid HX in the general formula (2) is the same as those described above.

In the general formula (2), n is preferably 3 to 500 and more preferably 6 to 500. When n is less than 3, resistance to blotting of ink and flowing of ink with water contact tends to be deteriorated. When n exceeds 500, there is a tendency that the molecular weight of the polyguanidine salt becomes too high for easy processing.

The polyguanidine salt described above is added into the substrate in the present invention. The substrate may be paper, a fibrous material, or a resin film.

Here, the paper used as the substrate includes paper made from pulp; paper made from mixture of pulp and synthetic fibers based on polyester, nylon or acrylic; and a synthetic paper having a micro-porous polymer layer on a base film such as polyester film, polypropylene film, polystyrene film and polyvinyl chloride film. All of above paper are suitably used for the recording material for the ink-jet printing system.

The fibrous material used as the substrate includes a woven fabric, a knitted fabric, and a nonwoven fabric made from synthetic fibers, natural fibers, semi-synthetic fibers, or hybrid fibers based on natural and synthetic fibers. A nonwoven fabric made from a thermoplastic resin can be used, too.

The resin film used as the substrate includes polyester film, polyvinyl chloride film, and polyolefin film. Surface treatment can be given to these films as required.

The recording material of the present invention can be manufactured according to any known processes without particular limitation.

For example, when paper made from pulp or paper made from mixture of pulp and synthetic fibers is employed as the substrate for the recording material, the recording material can be manufactured by performing papermaking process of pulp or mixture of pulp and synthetic fibers in the presence of the polyguanidine salt of the general formula (1) or its solution. Alternatively, after paper is manufactured, the polyguanidine salt of the general formula (1) can be coated or sprayed on the paper.

When a synthetic paper, a fibrous material or a resin film is employed as the substrate for the recording material, the recording material can be manufactured by coating, padding or spraying the polyguanidine salt of the general formula (1) on the substrate.

The amount of the polyguanidine salt in the recording material is not particularly limited, and can be selected according to the purpose of its application. For example, the recording material preferably contains the salt in an amount of 0.01 to 10 g per square meter. In this case, the recording material preferably contains the polyguanidine salt in the vicinity of its surface. Here, the vicinity of the surface means a region including the outermost surface of the recording material. When the amount of the polyguanidine salt is less than 0.01 g per square meter, resistance to blotting of ink and flowing of ink with water contact tends to be deteriorated. When the amount exceeds 10 g per square meter, there is a tendency that the hand-touch of the recording material is changed comparing with that of the recording material containing no polyguanidine salt.

Alternatively, the recording material preferably contains the polyguanidine salt in an amount of 0.01 to 10% by weight based on its total weight. In this case, the polyguanidine salt may be uniformly distributed throughout the recording material, or may be unevenly distributed in the recording material. When the amount of the polyguanidine salt is less than 0.01% by weight, resistance to blotting of ink and flowing of ink with water contact tends to be deteriorated. When the amount exceeds 10% by weight, there is a tendency that the hand-touch of the recording material is changed comparing with that of the recording material containing no polyguanidine salt.

The recording material of the present invention may further contain other additives as required. For example, it may contain a binder, an inorganic pigment or an organic pigment which have usually been employed in this type of application. Examples of the binder include oxidized starch and polyvinyl alcohol. Examples of the inorganic pigment include soft calcium carbonate, heavy calcium carbonate, kaolin (china clay), talc, calcium sulfate, barium sulfate, titanium oxide, zinc oxide, zinc sulfate, zinc carbonate, aluminum silicate, diatomaceous earth, calcium silicate, synthetic silica, aluminum hydroxide and alumina. Examples of the organic pigment include a styrene plastic pigment, an acrylic plastic pigment, a micro-capsulated pigment and a carbon resin pigment.

As explained above, in the present invention, the recording material does not exhibit blotting of ink during printing, and flowing or blotting of ink with water contact after printing because the recording material contains the polyguanidine salt of the general formula (1). This performance can be obtained for various printing systems. Although the mechanism for the resistance to blotting and flowing of ink is not fully understood, the inventors presume that the polyguanidine salt possibly exert a strong interaction with inks used in various printing systems, or with dyes and pigments contained therein. The inventors also presume that the interaction may be due to the chemical structure of the polyguanidine salt, which has a guanidine portion and a hydrophobic portion (aliphatic, aromatic or alicyclic hydrocarbon group) alternately.

The ink widely used for the ink-jet printing system is made by dissolving a water-soluble dye such as an acid dye, a basic dye and a direct dye into a solvent such as water, alcohol and glycol. The ink containing an oil-soluble dye or pigment is also applicable to the ink-jet recording system. In the present invention, the polyguanidine salt in the recording material is believed to have an ability to hold the ink tightly in the place where the ink is applied by printing. Therefore, the recording material of the present invention is particularly suitable for use in the ink-jet recording system.

EXAMPLES

In the following, preferred examples of the present invention will be explained in further detail, which will not restrict the present invention.

Test Methods

The test method for flowing or blotting of ink on the recording material when it is wetted with water (hereinafter referred to as water resistance test) and the test method for blotting of ink when it is applied on the recording material (hereinafter referred to as ink blotting test) are as follows:

Water Resistance Test

A recording material was solid-printed in a single color each selected from black, cyan, magenta and yellow using the ink-jet printer MJ-700V2C manufactured by Epson Corporation. The printed recording material was allowed to stand for an hour, and immersed in a stream of water for 5 minutes. Then, the printed area of the recording material was visually evaluated. The ink cartridge containing a black ink (product number: MJIC2) and the ink cartridge containing a cyan ink, a magenta ink and a yellow ink (product number: MJIC2C) were used for the testing.

○: No flowing or blotting of ink in the printed area was observed with water contact;

Δ: Slight blotting of ink in the printed area was observed;

x: Apparent flowing or blotting of ink in the printed area was observed with water contact.

Ink Blotting Test

Black dots were printed on a recording material using the ink-jet printer MJ-700V2C manufactured by Epson Corporation. The dots were visually evaluated with a loupe (50 magnifications).

○: No blotting was observed;

Δ: Slight blotting was observed;

x: Blotting was observed.

The weight-average molecular weight of the polymer was determined by gel permeation chromatography (GPC) manufactured by Tosoh Corporation (Model: HLC-8120GPC) using a polyoxyethylene glycol calibration basis. The solvent for GPC was an acetic acid buffer solution (pH: 4.7).

Synthesis Example 1

Synthesis of Polyhexamethyleneguanidine Phosphate

A reaction vessel was charged with 20.0 g of 1,6-hexamethylene diisothiocyanate, 11.6 g of 1,6-hexamethylenediamine and 130 g of N,N-dimethylformamide. These chemicals were allowed to react at 40° C. to 60° C. for 3 hours and disappearance of NCS group was confirmed. Then, 14.0 g of potassium carbonate was added and the temperature was raised to 80° C. 13.0 g of dimethylsulfuric acid was further added dropwise and the reaction was continued for 2 hours at the same temperature. After the completion of the reaction, the temperature was lowered and the reaction product was poured into water. The resultant precipitate was collected by filtration, and allowed to air dry.

The resultant solid product was dissolved in N,N-dimethylformamide, and ammonia gas was introduced at 30° C. to 40° C. for substitution, whereby polyhexamethyleneguanidine was obtained. Then, 9.8 g of phosphoric acid was added to precipitate polyhexamethyleneguanidine phosphate, and the precipitate was dissolved in a small amount of water. Methanol was added in the aqueous solution of the precipitate for reprecipitation. The resultant product was collected by filtration and dried. The polyhexamethyleneguanidine phosphate obtained had a weight-average molecular weight of 1440.

Synthesis Example 2

Synthesis of Polyhexamethyleneguanidine Hydrochloride

A reaction vessel was charged with 20.0 g of 1,6-hexamethylene diisothiocyanate, 11.6 g of 1,6-hexamethylenediamine and 130 g of N,N-dimethylformamide. These chemicals were allowed to react at 40° C. to 60° C. for 4 hours and disappearance of NCS group was confirmed. Then, 14.0 g of potassium carbonate was added and the temperature was raised to 80° C. 13.0 g of dimethylsulfuric acid was further added dropwise and the reaction was continued for 2 hours at the same temperature. After the completion of the reaction, the temperature was lowered and the reaction product was poured into water. The resultant precipitate was collected by filtration, and allowed to air dry.

The resultant solid product was dissolved in N,N-dimethylformamide, and ammonia gas was introduced at 30° C. to 40° C. for substitution, whereby polyhexamethyleneguanidine was obtained. Then, 5.5 g of hydrochloric acid was added to precipitate polyhexamethyleneguanidine hydrochloride, and the precipitate was dissolved in a small amount of water. Methanol was added in the aqueous solution of the precipitate for reprecipitation. The resultant product was collected by filtration and dried. The polyhexamethyleneguanidine hydrochloride obtained had a weight-average molecular weight of 1240.

Synthesis Example 3

Synthesis of Polyhexamethyleneguanidine Lactate

Polyhexamethyleneguanidine was obtained in the same manner as Synthesis Example 1. Then, 13.5 g of lactic acid was added to precipitate polyhexamethyleneguanidine lactate, and the precipitate was dissolved in a small amount of water. Methanol was added in the aqueous solution of the precipitate for reprecipitation. The resultant product was collected by filtration and dried. The polyhexamethyleneguanidine lactate obtained had a weight-average molecular weight of 1380.

Synthesis Example 4

Synthesis of Polyethyleneguanidine Phosphate

A reaction vessel was charged with 28.8 g of ethylene diisothiocyanate, 12.0 g of ethylenediamine and 130 g of N,N-dimethylformamide. These chemicals were allowed to react at 40° C. to 60° C. for 4 hours and disappearance of NCS group was confirmed. Then, 28.0 g of potassium carbonate was added and the temperature was raised to 80° C. 26.0 g of dimethylsulfuric acid was further added dropwise and the reaction was continued for 2 hours at the same temperature. After the completion of the reaction, the temperature was lowered and the reaction product was poured into water. The resultant precipitate was collected by filtration, and allowed to air dry.

The resultant solid product was dissolved in N,N-dimethylformamide, and ammonia gas was introduced at 30° C. to 40° C. for substitution, whereby polyethyleneguanidine was obtained. Then, 19.6 g of phosphoric acid was added to precipitate polyethyleneguanidine phosphate, and the precipitate was dissolved in a small amount of water. Methanol was added in the aqueous solution of the precipitate for reprecipitation. The resultant product was collected by filtration and dried. The polyethyleneguanidine phosphate obtained had a weight-average molecular weight of 1840.

Example 1

Two weight % aqueous solution of the polyhexamethyleneguanidine phosphate obtained in the Synthesis Example 1 (weight-average molecular weight: 1440) was coated on high quality paper using a bar-coater and the coated paper was dried at 105° C. for 3 minutes to obtain a recording material. The amount of the polyhexamethyleneguanidine phosphate coated was 0.5 g/m$^2$. Using this recording material, the water resistance test and the ink blotting test as described above were carried out.

Example 2

A recording material was obtained in the same manner as Example 1 except that polyhexamethyleneguanidine hydrochloride (weight-average molecular weight: 1240) obtained in Synthesis Example 2 was used in place of polyhexamethyleneguanidine phosphate (weight-average molecular weight: 1440). Then, the water resistance test and the ink blotting test as described above were carried out using this recording material. The amount of the polyhexamethyleneguanidine hydrochloride coated was 0.5 g/m$^2$.

Example 3

A recording material was obtained in the same manner as Example 1 except that polyhexamethyleneguanidine lactate (weight-average molecular weight: 1380) obtained in Synthesis Example 3 was used in place of polyhexamethyleneguanidine phosphate (weight-average molecular weight: 1440). Then, the water resistance test and the ink blotting test as described above were carried out using this recording material. The amount of the polyhexamethyleneguanidine lactate coated was 0.5 g/m$^2$.

Example 4

A recording material was obtained in the same manner as Example 1 except that polyethyleneguanidine phosphate (weight-average molecular weight: 1840) obtained in Synthesis Example 4 was used in place of polyhexamethyleneguanidine phosphate (weight-average molecular weight: 1440). Then, the water resistance test and the ink blotting test as described above were carried out using this recording material. The amount of the polyethyleneguanidine phosphate coated was 0.5 g/m$^2$.

Comparative Example 1

A recording material was obtained in the same manner as Example 1 except that polyethyleneimine (weight-average molecular weight: 1200) was used in place of polyhexamethyleneguanidine phosphate (weight-average molecular weight: 1440). Then, the water resistance test and the ink blotting test as described above were carried out using this recording material. The amount of the polyethyleneimine coated was 0.5 g/m$^2$.

The results of the water resistance test and the ink blotting test for the recording materials obtained in Examples 1 to 4 and Comparative Example 1 are shown in Table 1.

TABLE 1

|  | Water resistance test | | | | Ink blotting test |
| --- | --- | --- | --- | --- | --- |
|  | Black | Cyan | Magenta | Yellow |  |
| Example 1 | ○ | ○ | ○ | ○ | ○ |
| Example 2 | ○ | ○ | ○ | ○ | ○ |
| Example 3 | ○ | ○ | ○ | ○ | ○ |
| Example 4 | ○ | ○ | ○ | ○ | ○ |
| Comparative Example 1 | Δ | x | Δ | x | x |

Example 5

One weight % aqueous solution of the polyhexamethyleneguanidine phosphate obtained in Synthesis Example 1 (weight-average molecular weight: 1440) was applied on a polyester pongee fabric by padding (pick up: 80%). The coated fabric was dried at 105° C. for 3 minutes to obtain a recording material. The amount of the polyhexamethyleneguanidine phosphate applied was 0.8% by weight based on the total weight of the recording material. Using this recording material, the water resistance test and the ink blotting test as described above were carried out.

Example 6

A recording material was obtained in the same manner as Example 5 except that polyhexamethyleneguanidine hydrochloride (weight-average molecular weight: 1240) obtained in Synthesis Example 2 was used in place of polyhexamethyleneguanidine phosphate (weight-average molecular weight: 1440). Then, the water resistance test and the ink blotting test as described above were carried out using this recording material. The amount of the polyhexamethyleneguanidine hydrochloride applied was 0.8% by weight based on the total weight of the recording material.

Example 7

A recording material was obtained in the same manner as Example 5 except that polyhexamethyleneguanidine lactate (weight-average molecular weight: 1380) obtained in Synthesis Example 3 was used in place of polyhexamethyleneguanidine phosphate (weight-average molecular weight: 1440). Then, the water resistance test and the ink blotting test as described above were carried out using this recording material. The amount of the polyhexamethyleneguanidine lactate applied was 0.8% by weight based on the total weight of the recording material.

Example 8

A recording material was obtained in the same manner as Example 5 except that polyethyleneguanidine phosphate (weight-average molecular weight: 1840) obtained in Synthesis Example 4 was used in place of polyhexamethyleneguanidine phosphate (weight-average molecular weight: 1440). Then, the water resistance test and the ink blotting test as described above were carried out using this recording material. The amount of the polyethyleneguanidine phosphate applied was 0.8% by weight based on the total weight of the recording material.

Comparative Example 2

A recording material was obtained in the same manner as Example 5 except that polyethyleneimine (weight-average molecular weight: 1200) was used in place of polyhexamethyleneguanidine phosphate (weight-average molecular weight: 1440). Then, the water resistance test and the ink blotting test as described above were carried out using this recording material. The amount of the polyethyleneimine applied was 0.8% by weight based on the total weight of the recording material.

The results of the water resistance test and the ink blotting test for the recording materials obtained in Examples 5 to 8 and Comparative Example 2 are shown in Table 2.

TABLE 2

| | Water resistance test | | | | Ink blotting test |
|---|---|---|---|---|---|
| | Black | Cyan | Magenta | Yellow | |
| Example 5 | ○ | ○ | ○ | ○ | ○ |
| Example 6 | ○ | ○ | ○ | ○ | ○ |
| Example 7 | ○ | ○ | ○ | ○ | ○ |
| Example 8 | ○ | ○ | ○ | ○ | ○ |

TABLE 2-continued

| | Water resistance test | | | | Ink blotting test |
|---|---|---|---|---|---|
| | Black | Cyan | Magenta | Yellow | |
| Comparative Example 2 | Δ | x | Δ | x | x |

Example 9

A mixed solution was made by mixing 2 weight % aqueous solution of the polyhexamethyleneguanidine phosphate (weight-average molecular weight: 1440) and 2 weight % aqueous solution of Neosticker 700 (film anchoring agent) manufactured by Nicca Chemical Co., Ltd. The mixed solution was coated on polyester film using a bar-coater and the coated film was dried at 105° C. for 3 minutes to obtain a recording material. The amount of the polyhexamethyleneguanidine phosphate coated was 0.5 g/m$^2$. Using this recording material, the water resistance test and the ink blotting test as described above were carried out.

Example 10

A recording material was obtained in the same manner as Example 9 except that polyhexamethyleneguanidine hydrochloride (weight-average molecular weight: 1240) obtained in Synthesis Example 2 was used in place of polyhexamethyleneguanidine phosphate (weight-average molecular weight: 1440). Then, the water resistance test and the ink blotting test as described above were carried out using this recording material. The amount of the polyhexamethyleneguanidine hydrochloride coated was 0.5 g/m$^2$.

Example 11

A recording material was obtained in the same manner as Example 9 except that polyhexamethyleneguanidine lactate (weight-average molecular weight: 1380) obtained in Synthesis Example 3 was used in place of polyhexamethyleneguanidine phosphate (weight-average molecular weight: 1440). Then, the water resistance test and the ink blotting test as described above were carried out using this recording material. The amount of the polyhexamethyleneguanidine lactate coated was 0.5 g/m$^2$.

Example 12

A recording material was obtained in the same manner as Example 9 except that polyethyleneguanidine phosphate (weight-average molecular weight: 1840) obtained in Synthesis Example 4 was used in place of polyhexamethyleneguanidine phosphate (weight-average molecular weight: 1440). Then, the water resistance test and the ink blotting test as described above were carried out using this recording material. The amount of the polyethyleneguanidine phosphate coated was 0.5 g/m$^2$.

Comparative Example 3

A recording material was obtained in the same manner as Example 9 except that polyethyleneimine (weight-average molecular weight: 1200) was used in place of polyhexamethyleneguanidine phosphate (weight-average molecular weight: 1440). Then, the water resistance test and the ink blotting test as described above were carried out using this recording material. The amount of the polyethyleneimine coated was 0.5 g/m$^2$.

The results of the water resistance test and the ink blotting test for the recording materials obtained in Examples 9 to 12 and Comparative Example 3 are shown in Table 3.

TABLE 3

|  | Water resistance test | | | | Ink blotting test |
| --- | --- | --- | --- | --- | --- |
|  | Black | Cyan | Magenta | Yellow |  |
| Example 9 | ○ | ○ | ○ | ○ | ○ |
| Example 10 | ○ | ○ | ○ | ○ | ○ |
| Example 11 | ○ | ○ | ○ | ○ | ○ |
| Example 12 | ○ | ○ | ○ | ○ | ○ |
| Comparative Example 3 | Δ | x | Δ | x | x |

As can be seen from the results of the water resistance test and the ink blotting test for the recording materials obtained in Examples 1 to 12 and Comparative Examples 1 to 3, the recording materials of the present invention showed an excellent resistance to flowing and blotting of all inks (black, cyan, magenta and yellow inks). This property was obtained for all of the substrates used (paper, a fibrous material, and a resin film). On the other hand, the recording materials obtained in the Comparative Examples exhibited poor resistance to flowing and blotting of inks with all substrates used. In the Comparative Examples, resistance to flowing and blotting of cyan ink and yellow ink was quite unsatisfactory.

INDUSTRIAL APPLICABILITY

As explained in the foregoing, the present invention can provide a recording material, which is particularly suitable for use in an ink-jet recording system, which does not exhibit blotting of ink during printing and flowing or blotting of ink with water contact after printing.

What is claimed is:

1. A recording material comprising a substrate and a polyguanidine salt of the general formula (1) contained in said substrate:

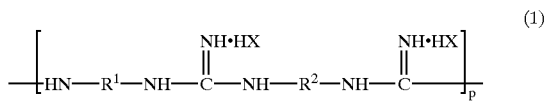

(1)

wherein $R^1$ and $R^2$ may be the same or different, and each represents a group selected from the group consisting of a divalent aliphatic hydrocarbon group, a divalent aromatic hydrocarbon group and a divalent alicyclic hydrocarbon group; HX is an acid selected from the group consisting of a mineral acid and an organic acid; and p is an integer of 1 to 250.

2. A recording material according to claim 1, wherein said polyguanidine salt is a polyguanidine salt of the general formula (2):

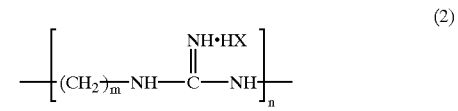

(2)

wherein HX is an acid selected from the group consisting of a mineral acid and an organic acid; n is an integer of 3 to 500; and m is an integer of 2 to 6.

3. A recording material according to claim 1, wherein said substrate comprises at least one material selected from the group consisting of paper, a fibrous material and a resin film.

4. A recording material according to claim 1, wherein said substrate contains said polyguanidine salt in an amount of 0.01 to 10 g per square meter in the vicinity of a surface thereof.

5. A recording material according to claim 1, wherein said recording material contains said polyguanidine salt in an amount of 0.01 to 10% by weight based on a total weight of said recording material.

6. A recording material according to claim 1, wherein said recording material is a recording material for an ink-jet recording system.

* * * * *